United States Patent
Shiraki

(10) Patent No.: US 7,593,036 B2
(45) Date of Patent: Sep. 22, 2009

(54) DIGITAL CAMERA AND DATA MANAGEMENT METHOD

(75) Inventor: Hidenori Shiraki, Nagano (JP)

(73) Assignee: Eastman Kodak Company, Rochester, NY (US)

( * ) Notice: Subject to any disclaimer, the term of this patent is extended or adjusted under 35 U.S.C. 154(b) by 422 days.

(21) Appl. No.: 11/464,989

(22) Filed: Aug. 16, 2006

(65) Prior Publication Data

US 2007/0146503 A1    Jun. 28, 2007

(30) Foreign Application Priority Data

Dec. 27, 2005    (JP) .............................. 2005-374823

(51) Int. Cl.
*H04N 5/225*    (2006.01)
(52) U.S. Cl. .................... 348/207.2; 396/311
(58) Field of Classification Search .............. 348/231.1, 348/231.2, 231.3, 47, 207.2, 231, 347, 312, 348/211.11, 211.1, 333.1, 333.2, 333.03, 348/207.99, 207.1
See application file for complete search history.

(56) References Cited

U.S. PATENT DOCUMENTS

| 5,699,108 A | 12/1997 | Katayama et al. | |
|---|---|---|---|
| 5,903,303 A | * 5/1999 | Fukushima et al. | ............ 348/47 |
| 6,278,480 B1 | * 8/2001 | Kurahashi et al. | .............. 348/59 |
| 6,806,978 B1 | * 10/2004 | Tamura et al. | .............. 358/1.15 |
| 6,977,676 B1 | * 12/2005 | Sato et al. | .............. 348/211.11 |
| 2003/0011791 A1 | * 1/2003 | Ejima et al. | .................. 358/1.2 |

FOREIGN PATENT DOCUMENTS

| JP | 1995-072600 | 3/1995 |
|---|---|---|
| JP | 2001-257926 | 9/2001 |
| JP | 2003-298919 | 10/2003 |
| JP | 2004-282296 | 10/2004 |

\* cited by examiner

*Primary Examiner*—David L Ometz
*Assistant Examiner*—Ahmed A Berhan
(74) *Attorney, Agent, or Firm*—Pamela R. Crooker; Peyton C. Watkins

(57) ABSTRACT

A digital camera capable of compensating a portion of a captured image with another image without putting a squeeze on storage capacity. The digital camera has a plurality of image-capturing systems capable of essentially simultaneously capturing images of a single subject at mutually-different angles of view. Information about relevant image data which are items of the other simultaneously-captured image data is imparted as relevant information to at least one item of image data among items of image data captured by the plurality of image-capturing systems. The image data imparted with the relevant information and the relevant image data captured simultaneously with the image data are stored as separate items of data in user memory which serves as storage means.

2 Claims, 10 Drawing Sheets

DIGITAL CAMERA AND DATA MANAGEMENT METHOD

CROSS REFERENCE TO RELATED APPLICATIONS

This application claims priority to Japanese Patent Application No. 2005-374823, filed on Dec. 27, 2005, which is incorporated herein by reference in its entirety.

FIELD OF THE INVENTION

The present invention relates to a digital camera having a plurality of image-capturing systems, as well as to a method for managing data in the digital camera.

Related Art

A technique for compensating for a portion of a captured image with another item of image data has been known. One of such compensation techniques is for synthesizing image data of comparatively low resolution with image data of comparatively high resolution, to thus prepare image data which have high resolution in only a noteworthy portion thereof. This is a technique useful for, e.g., a portrait. In a portrait, a person is a main subject, and the area of the person can be said to be an area which gains the user's attention. Such an area of the person is desirably of high resolution. In contrast, even when the definition of a background around the person has become slightly degraded, the user has little complaint. In order to capture the background as well as the person with high resolution, an enormous number of CCD elements are required, which in turn renders a camera expensive. For this reason, in a known technique, telescopic image data formed by capturing essentially only a person are synthesized with a wide-angle image formed by capturing the person and a background thereof. In this case, the number of pixels assigned to the area of the person in the telescopic image is greater than the number of pixels assigned to the same in the wide-angle image. The telescopic image can be said to be of higher definition in connection with the area of the person. Accordingly, the area of the person in the telescopic image is pasted to the area of the person in the wide-angle image, whereby an image which is of high resolution in only a noteworthy portion thereof is acquired.

BACKGROUND OF THE INVENTION

Japanese Patent Laid-Open Publication No. 2003-298919 describes a digital camera having such synthesis means. The digital camera described in the publication comprises an image-capturing system having a telescopic lens and an image-capturing system having a wide-angle lens. A single subject can be captured essentially simultaneously at different angles of view by means of both image-capturing systems. This digital camera synthesizes a wide-angle view and a telescopic view, both of which have been obtained through image-capturing operation, and stores the thus-synthesized image.

Although the digital camera described in the patent publication stores a synthesized image, large-capacity storage means is required, because the synthesized image is large in file size. When a wide-angle view and a telescopic view are synthesized together, the number of pixels of the wide-angle view is usually increased by means of interpolation so as to match the number of pixels of the telescopic image, and the wide-angle image complemented with the pixels and the telescopic image are synthesized together. As a result, the file size of the synthesized image data is significantly increased.

For instance, each of a pre-interpolation wide-angle image and a telescopic image is assumed to have 2592 (width)×1944 (length) pixels (about 5 million pixels). A wide-angle lens used for capturing a wide-angle image has a 35 mm-film equivalent focal length of 48 mm, and the telescopic lens used for capturing a telescopic image has a 35 mm-film equivalent focal length of 96 mm. In this case, the range of a field expressed by one pixel in a wide-angle image is expressed by four pixels in the telescopic image. For instance, when an image of an object of predetermined size has been captured, the object is expressed by "n" pixels in a wide-angle of image and expressed by n×4 pixels in a telescopic image. In other words, a scale of 1:2 exists between a wide-angle image and a telescopic image.

In order to synthesize the telescopic image and the wide-angle image together without involvement of a decrease in the number of pixels of the telescopic image, the wide-angle image must have been previously enlarged double in both the vertical and horizontal directions by means of interpolating pixels. More specifically, the wide-angle view must have been enlarged to an image of 5184×3888 pixels. The number of pixels of a synthesized image, which is obtained by synthesizing the wide-angle image having undergone pixel interpolation with the telescopic image, comes to as many as about 20 million.

An increase in file size resulting from synthesis of the images becomes more noticeable with increasing ratio of the focal length of the wide-angle image to the focal length of the telescopic image. When the focal length ratio is assumed to be "n," the number of pixels of the synthesized image is simply calculated as $n^2$ times the number of pixels of a pre-synthesis image. The synthesized image of such large volume puts a significant squeeze on the finite storage capacity of the digital camera.

SUMMARY OF THE INVENTION

Therefore, the present invention provides a digital camera capable of compensating for a portion of a captured image with another image without putting a squeeze on storage capacity, as well as providing a method for managing data in the digital camera.

The present invention provides a digital camera comprising:

a plurality of image-capturing systems which essentially simultaneously capture images of a single subject at mutually-different angles of view;

an associating unit which imparts, to at least one of a plurality of items of image data captured by means of image-capturing actions of the plurality of image-capturing systems, relevant information indicating association with relevant image data which are items of the other simultaneously-captured image data; and a storage unit for storing the image data imparted with the relevant information and the relevant image data as separate items of data.

In a preferred mode, the relevant information includes file names of the relevant image data. Further, the relevant information desirably includes coordinate information showing a reference position of an image range overlapping the relevant image. Moreover, the relevant information includes magnifying power, which is a ratio among sizes of figures in the plurality of simultaneously-captured images.

Another present invention provides a data management method for a digital camera which essentially simultaneously captures images of a single subject through use of a plurality of image-capturing systems in order to compensate a portion of a captured image with a relevant image captured at a different angle of view essentially simultaneously with the image, the method comprising the steps of:

Imparting, to at least one of a plurality of items of image data captured by means of image-capturing actions of the plurality of image-capturing systems, relevant information indicating association with relevant image data which are items of the other simultaneously-captured image data; and storing in a storage unit the image data imparted with the relevant information and the relevant image data as separate items of data.

According to the present invention, a plurality of files that have been essentially simultaneously captured are stored as separated items of data. Therefore, when compared with a conventional technique of synthesizing a plurality of images and storing the thus-synthesized file, a data size required for storage of data can be reduced. Further, relevant information is retained, and hence compensation using another image of the simultaneously-captured images can be performed as required.

The invention will be more clearly comprehended by reference to the embodiments provided below. However, the scope of the invention is not limited to these embodiments.

BRIEF DESCRIPTION OF THE DRAWINGS

Preferred embodiments of the present invention will be described in detail based on the following figures, wherein.

DETAILED DESCRIPTION OF THE PREFERRED EMBODIMENTS

Figure 1:
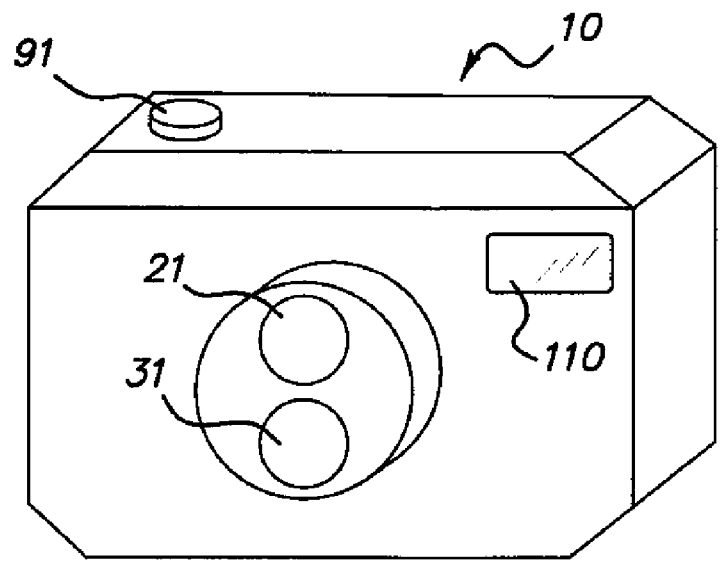
FIG. 1 is a perspective view of a digital camera of an embodiment of the present invention when viewed from the front.
Figure 2:
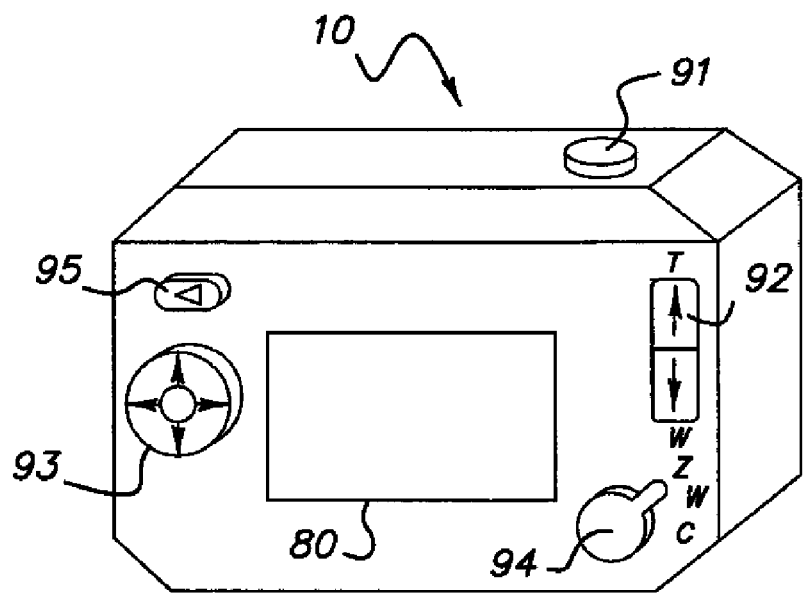
FIG. 2 is a perspective view of the digital camera when viewed from the back thereof.
Figure 3:
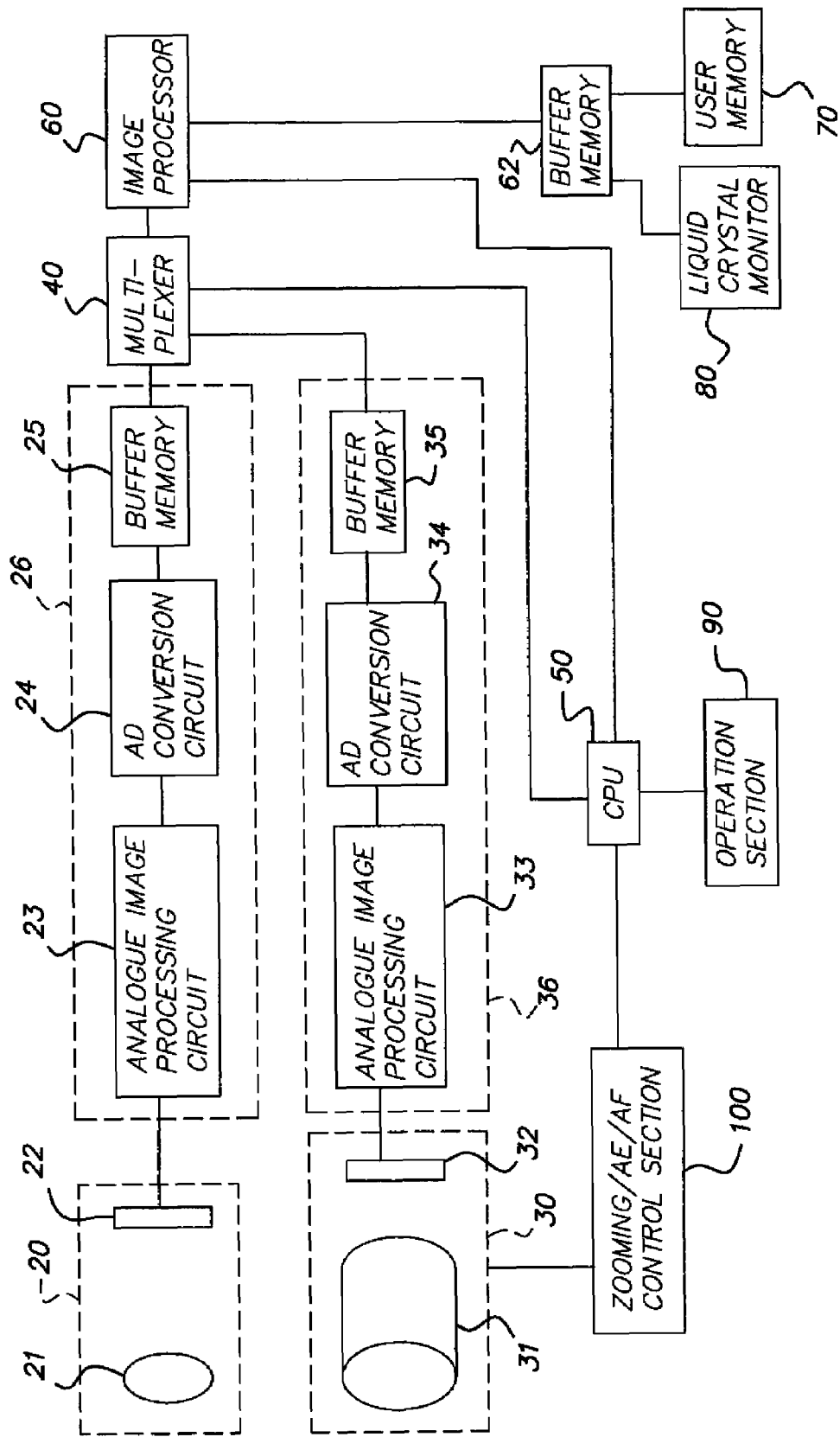
FIG. 3 is a block diagram showing the configuration of the digital camera.

An embodiment of the present invention will be described hereinbelow by reference to the drawings. FIG. 1 is a perspective view of a digital camera 10 which is an embodiment of the present invention when viewed from the front; FIG. 2 is a perspective view of the digital camera 10 when viewed from the back thereof; and FIG. 3 is a block diagram showing the configuration of the digital camera 10.

This digital camera 10 has two mutually-independent image-capturing systems. A first image-capturing system 20 has a first image-capturing lens system 21 having a fixed focal length, and forms an image of a subject on a first image-capturing element 22. A second image-capturing system 30 has a second image-capturing zoom lens system 31, and forms the image of the subject on a second image-capturing element 32.

The first image-capturing element 22 and the second image-capturing element 32 are equal to each other in an aspect ratio as well as in the number of CCD elements. Therefore, the first image-capturing system 20 and the second image-capturing system 30 of the same screen size and are arranged so as to be able to capture image data of the same number of pixels. However, there is no necessity for the two image-capturing elements to have the same number of pixels, and the image-capturing elements may differ in the number of pixels.

As mentioned previously, the first image-capturing lens system 21 is a lens of fixed focal length. The focal length of the first image-capturing lens system 21 is shorter than the focal length achieved at a short focal length end of the second image-capturing zoom lens system 31. For instance, a fixed focal length lens having a 35 mm-film equivalent focal length of 23 mm can be used as the first image-capturing lens system 21, and a zoom lens having a 35 mm-film equivalent focal length of 39 to 117 mm can be used as the second image-capturing lens system 31. So long as the first image-capturing system 20 can capture an image which is wider than that captured by the second image-capturing system 30, or conversely the second image-capturing system 30 can capture an image which is more telescopic than that captured by the first image-capturing system 20, both the first image-capturing lens system 21 and the second image-capturing lens system 31 may be zoom lenses or fixed focal length lenses.

As will be described later, the first image-capturing system 20 and the second image-capturing system 30 can also be used alone or simultaneously. The first image-capturing system 20 and the second image-capturing system 30 can essentially simultaneously capture a single subject. Consequently, two images of the single subject, which have been captured essentially simultaneously, can be obtained at mutually-different angles of view.

Two mutually-independent signal processing sections 26, 36 are provided at a stage subsequent to the two image-capturing systems 20, 30. The two signal processing sections 26, 36 subject image signals output from the corresponding image-capturing systems 20, 30 to predetermined processing.

The first signal processing section 26 is provided with an analogue image processing circuit 23, an AD conversion circuit 24, and buffer memory 25. An image signal output from the first image-capturing system 20 is subjected to clamp processing and amplification processing in the analogue image processing circuit 23. Subsequently, after having undergone A/D conversion processing in the AD conversion circuit 24, the image signal is temporarily stored in the buffer memory 25 as first digital image data.

The second signal processing section 36 has the same configuration as that of the first signal processing section 26, and is equipped with an analogue image processing circuit 33, an AD conversion circuit 34, and buffer memory 35. The image signal output from the second image-capturing system 30 is subjected to clamp processing, amplification processing, and AD conversion processing, and is then temporarily stored in the buffer memory 35 as second digital image data.

In accordance with a command from a CPU 50, a multiplexer 40 selects either one of the buffer memory 25 and the buffer memory 35, to thereby fetch the image data temporarily stored in the selected buffer memory. The thus-fetched image data are output to an image signal processor 60 in a subsequent stage.

The image signal processor 60 subjects received image data to various processing operations, such as γ correction, color correction, white balance processing, image compression processing, and the like. The image signal processor 60 also generates header data appropriate to respective image data. The thus-generated header data are recorded in one file along with the image data, and are output as an image file to buffer memory 62. The header data include photography condition information such as a date and time of photography, the amount of exposure, and the like; image information showing thumbnail images and data sizes of respective items of image data; and information about other image data captured simultaneously with the image data. The header data will be described in detail later.

The buffer memory 62 is work memory, and an image file output from the previously-described image signal processor 60, an image file read from memory 70, and the like are temporarily recorded in the buffer memory 62. The user memory 70 is storage means used for recording and retaining captured image files. In response to a user command, a determination is made as to whether or not the captured image is to be stored in the user memory 70. Specifically, captured image data are displayed on a liquid-crystal monitor 80. After having ascertained details of the image displayed on the liquid-crystal monitor 80, the user issues a command as to whether or not to store the image file in the user memory 70.

The liquid-crystal monitor 80 is display means for displaying the image data instructed by the user from among captured image data and the image data stored in the user memory 70. This liquid-crystal display monitor 80 is usually lower than the image data in terms of the number of pixels. Therefore, when image data are displayed on the liquid-crystal monitor 80, the image data are subjected to display processing in the image signal processor 60.

The CPU 50 controls the entire sequence of the camera in response to an input from an operation section 90 formed from a plurality of switches and the like, thereby executing various jobs associated with image-capturing operation. The operation section 90 is a user interface which receives a command from the user, and is formed from a release button 91, a zoom button 92, a cross-key pad 93, a switching lever 94, a playback button 95, and the like. The release button 91 is a button which receives a command for image-capturing operation. When depressed halfway down (in a "first release state"), the release button 91 receives an image-capturing standby command. When depressed all the way down (in a "second release state"), the release button 91 receives an image-capturing command. The zoom button 92 is a button used for instructing the amount of zoom of the second image-capturing lens 31. The switching lever 94 is a lever capable of selecting one from three positions; namely, a position Z (zoom), a position W (wide), and a position C (combination). When the switching lever 94 is situated at "Z," the second image-capturing system 30 is commanded to solely capture an image. When the switching lever 94 is situated at "W," the first image-capturing system 20 is commanded to solely capture an image. When the switching lever 94 is situated at "C," the first and second image-capturing systems 20, 30 are commanded to simultaneously capture an image.

Further, the digital camera 10 comprises various types of members provided in the known digital camera 10, such as a zoom/AE/AF control section 100 for performing AF control, AE control, zoom control, and the like, during capture of an image; a strobe firing section 110; and others. The configurations and features of these members are analogous to those provided conventionally, and hence their explanations are omitted.

Figure 4A:
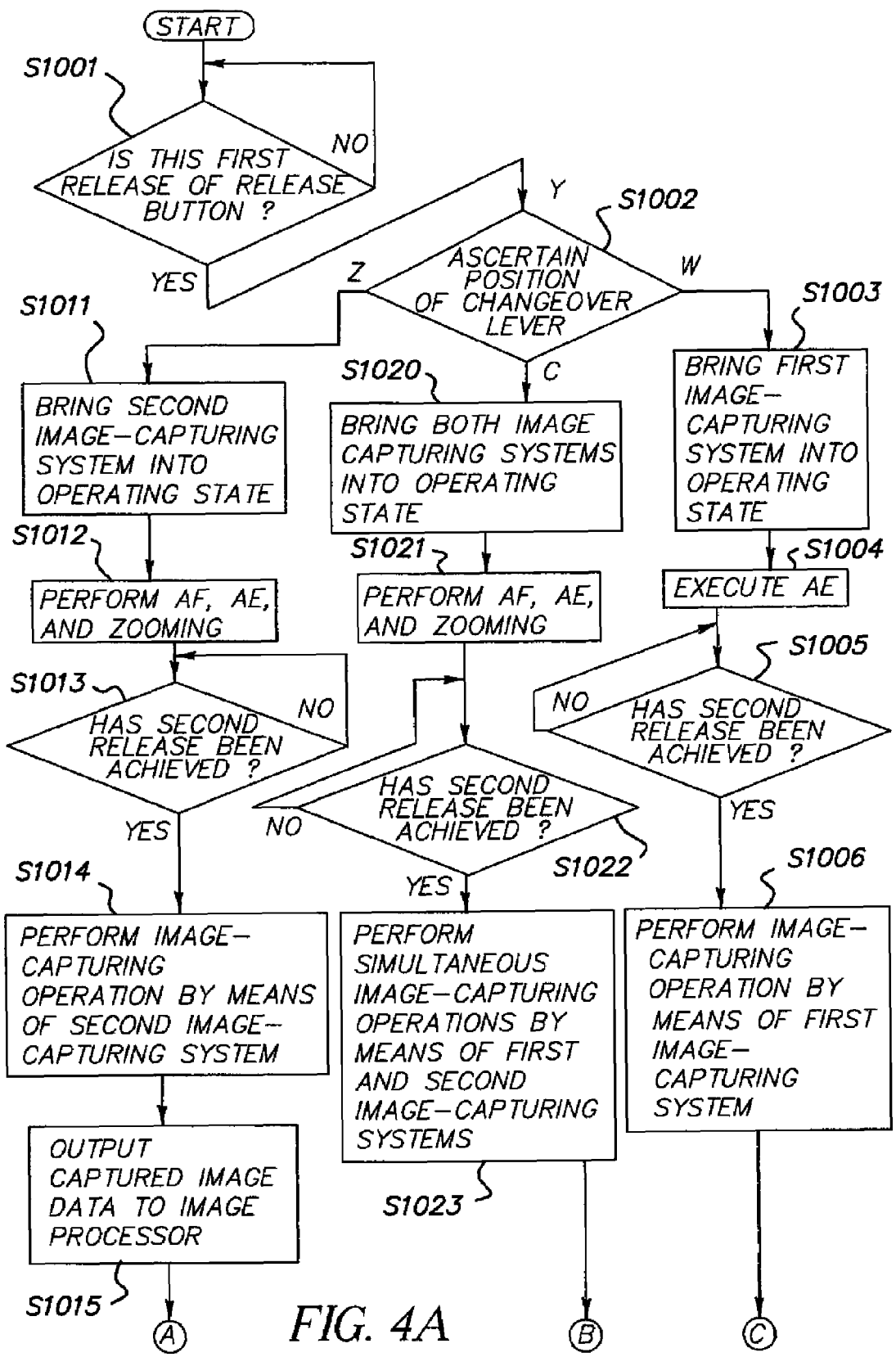
FIG. 4A and 4B are flowchart showing the flow of image-capturing operation.
Figures 4, 4A, 4B:
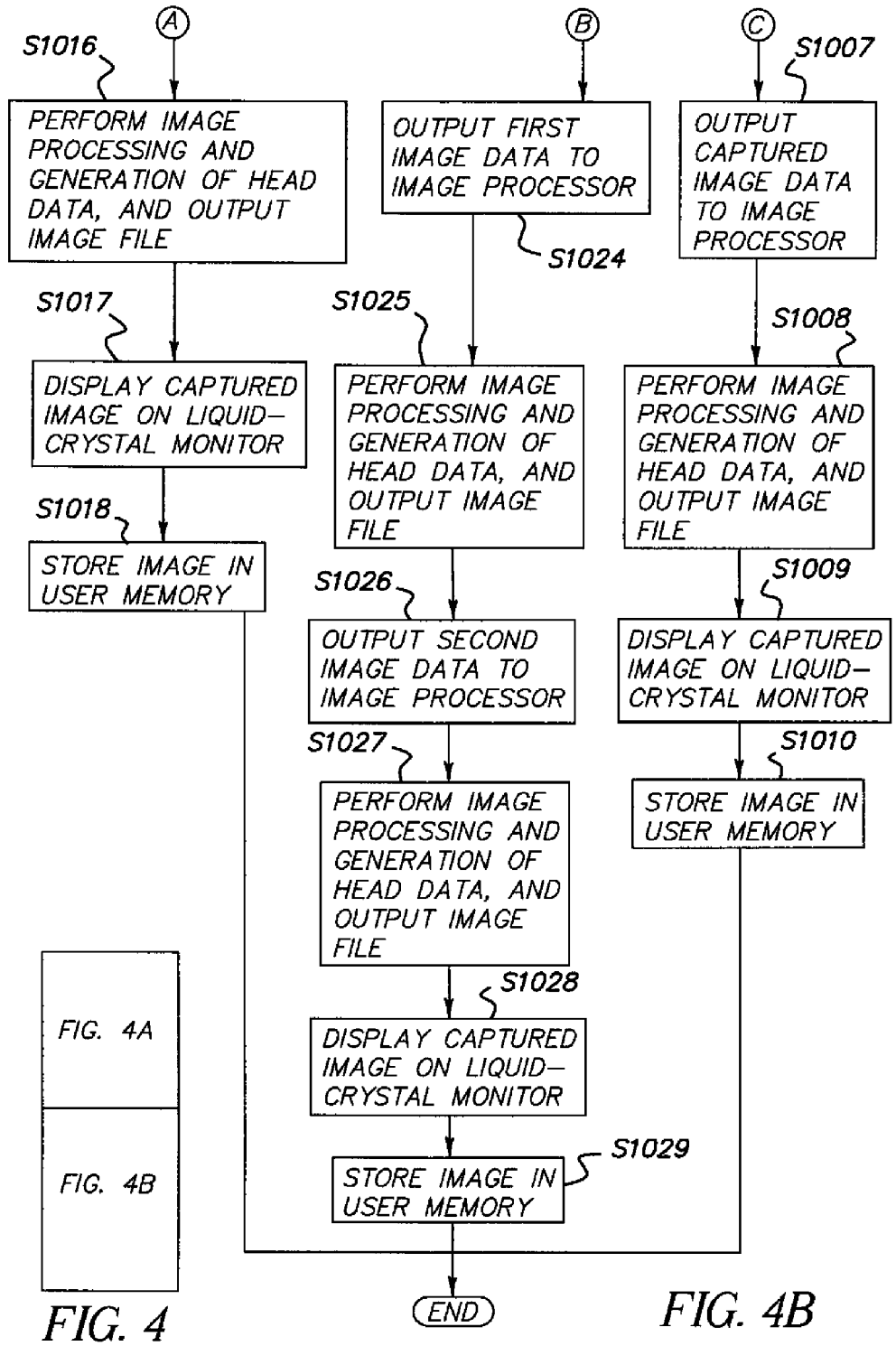

Flow of image-capturing operation of the digital camera 10 will now be described briefly. FIGS. 4A and 4B are flowchart showing flow of image-capturing operation performed by the digital camera 10. When the release button 91 is depressed halfway down and brought into a first release state (S1001), image-capturing operation is started. When the first release state is detected, the CPU 50 ascertains the position of the switching lever 94 (S1002). When the switching lever 94 is situated at the position "W," image-capturing operation is performed solely by the first image-capturing system 20. Specifically, the first image-capturing system 20 is switched to an operating state (S1003). Subsequently, AE (Autoexposure) for determining the optimum amount of exposure is performed on the basis of the amount of incident light, and the like (S1004). In this state, the release button 91 waits for being depressed all the way down to thus enter a second release state (S1005). When the release button has entered the second release state, the electric charges accumulated in the first image-capturing element 22 are emitted once, and the electric charges are accumulated for a period of time during which a predetermined amount of exposure is achieved, and image-capturing operation is performed (S1006). The image signal obtained by means of image-capturing operation is subjected to predetermined processing in the signal processing section 26, and the signal is then delivered to the buffer memory 25. The multiplexer 40 fetches the image data temporarily stored in the buffer memory 25, and sends the image data to the image signal processor 60 (S1007). The image signal processor 60 subjects received image data to predetermined image processing, to thus prepare header data for the image data, and creates an image file including the image data and the header data (S1008).

After having been temporarily stored in the buffer memory 62, the image data generated by the image signal processing processor 60 is displayed on the liquid-crystal monitor 80 (S1009). Upon ascertainment of details of the displayed image data, the user issues a command to record the image data, when necessary. When a command to record an image has been issued by the user, the image data are recorded in the user memory 70 (S1010).

Turning back to step S1002, flow of processing performed when the switching lever 94 is situated at the position Z (zoom) will now be described. This case is essentially analogous to the case where the switching lever 94 is situated at the position W (wide). When the switching lever 94 is situated at the position Z (zoom), the second image-capturing system 30 is brought into an operating state (S1011). Subsequently, AE responsive to the amount of incident light, AF (autofocus) responsive to a distance to a subject, and zooming action responsive to the amount of zoom commanded by the user are performed (S1012). In this state, the release button 91 waits for being depressed all the way down to thus enter the second release state (S1013). When the release button has entered the second release state, the electric charges accumulated in the second image-capturing element 32 are emitted once, and the electric charges are accumulated for a period of time during which a predetermined amount of exposure is achieved, and image-capturing operation is performed (S1014). The image signal obtained by means of image-capturing operation is subjected to predetermined processing in the signal processing section 36, and the signal is then delivered to the buffer memory 35. The multiplexer 40 fetches the image data temporarily stored in the buffer memory 35, and sends the image data to the image signal processor 60 (S1015). The image signal processor 60 subjects received image data to predetermined image processing, to thus prepare header data for the image data, and creates an image file including the image data and the header data (S1016).

After having been temporarily stored in the buffer memory 62, the image data generated by the image signal processing processor 60 are displayed on the liquid-crystal monitor 80 (S1017). Upon ascertainment of details of the displayed image data, the user issues a command to record the image data, when necessary. When a command to record an image has been issued by the user, the image data are recorded in the memory (S1018).

Turning back to step S1002, flow of processing performed when the switching lever 94 is situated at the position C (combination) will now be described. In this case the first image-capturing system 20 and the second image-capturing system 30 simultaneously perform image-capturing operations. Therefore, the CPU 50 brings the first image-capturing system 20 and the second image-capturing system 30 into operating state (S1020). The first image-capturing system 20 and the second image-capturing system 30 perform AE responsive to the amount of incident light. In the case of the second image-capturing system 30 having a zoom lens, AF and zooming are further performed (S1021). In this state, the camera waits until the release button enters the second release state (S1022).

When the second release state has been detected, the electric charges accumulated in the first image-capturing element 22 and the second image-capturing element 32 are emitted once, and the electric charges are accumulated for a period of time during which a predetermined amount of exposure is achieved, and image-capturing operation is performed (S1023). In the first image-capturing element 22 and the second image-capturing element 32, emission of the electric charges and timing of accumulation are basically identical. The first image-capturing system 20 and the second image-capturing system 30 substantially simultaneously perform image-capturing operation.

Image signals obtained through image-capturing actions are subjected to predetermined processing in the corresponding signal processing sections 26, 36, and the thus-processed signals are temporarily stored in the corresponding buffer memories 25, 35. The multiplexer 40 fetches the first image data temporarily stored in the buffer memory 25 assigned to the first image-capturing system 20 among the two buffer memories 25, 35, and outputs the thus-fetched first image data to the image signal processor 60 (S1024). The image signal processor 60 subjects the first image data to predetermined image processing, to thus prepare header data, and creates an image file including the image data and the header data (S1025). The first image data having undergone these processing operations are temporarily stored in the buffer memory 62.

Subsequently, the multiplexer 40 fetches the second image data temporarily stored in the buffer memory 35 assigned to the second image-capturing system 30, and sends the image data to the image signal processor 60 (S1026). The image signal processor 60 subjects the second image data to predetermined image processing, to thus prepare header data for the image data, and creates an image file including the image data and the header data (S1027). The second image data having undergone these processing operations are temporarily stored in the buffer memory 62 along with the first image data.

Subsequently, the capturing image data are displayed on the liquid-crystal monitor 80 (S1028). The image data displayed are basically first image data. The first image data are wide-angle image data captured by the first image-capturing system 20 having a fixed focal length lens. Therefore, the entirety of a captured image can be ascertained by displaying the first image data corresponding to the wide-angle image. In accordance with a user command, the second image data may be displayed, or the first image data and the second image data may be displayed simultaneously.

Upon ascertainment of details of the displayed image data, the user issues a command to record the image data, when necessary. When a command to record an image has been issued by the user, the first image data and the second image data are recorded in the memory 70 (S1029).

Figure 5:
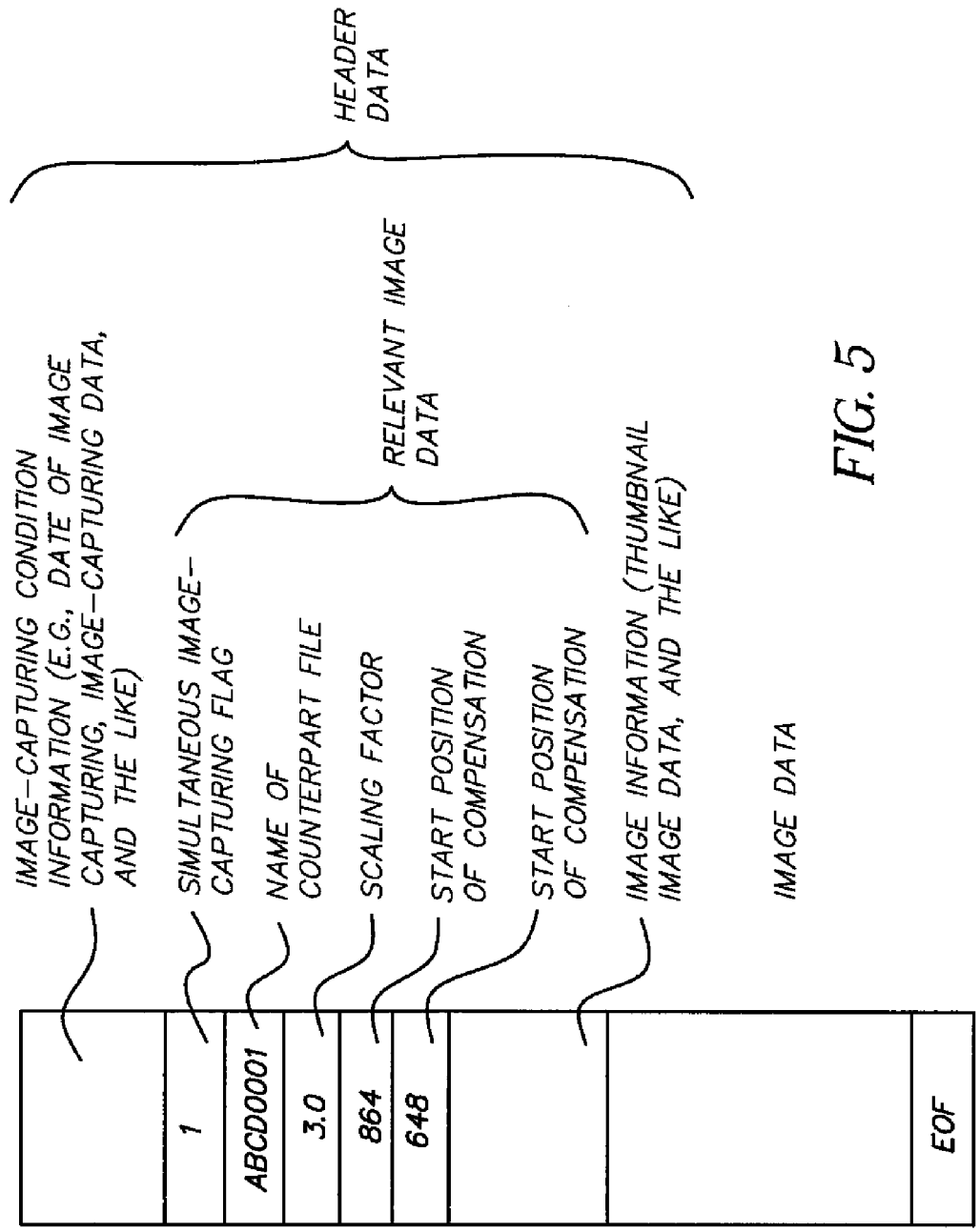
FIG. 5 is a view showing the configuration of an image file.

The configuration of an image file generated by the digital camera 10 will now be described by reference to FIG. 5. FIG. 5 is a view showing the configuration of an image file obtained in a combination mode; namely, when the first image-capturing system 20 and the second image-capturing system 30 have simultaneously performed image-capturing actions. An image file is generally divided into image data showing details of a captured image and header data showing various types of pieces of information relating to the image file. The header data include photography condition information, image information, and relevant information. The photography condition information relates to various conditions required when image-capturing operation has been performed, such as a date and time of the image data, the amount of exposure, firing/nonfiring of flash light, white balance settings, and the like. The image information relates to image data such as thumbnail images and data sizes of respective items of image data, and the like. The image-capturing condition information and the image information are pieces of information frequently used in conventional image files, and hence their detailed explanations are omitted.

The relevant information relates to relevant image data which are other image data obtained by means of simultaneous image-capturing operations. The relevant information comprises a "simultaneous image-capturing flag," a "relevant image file name," "magnifying power," a "compensation start position X," and a "compensation start position Y." The "simultaneous image-capturing flag" shows whether or not the image data have been captured in the combination mode; in other words, whether or not another item of simultaneously-captured image data is present. When the image has been captured in the combination mode, a flag "1" is recorded. When the image has been captured in the zoom mode or the wide mode, a flag "0" is recorded.

When the "simultaneous image-capturing flag" is "1," a value of the "relevant image file name," a value of the "magnifying power," a value of the "compensation start position X," and a value of the "compensation start position Y" are successively recorded. In contrast, when the "simultaneous image-capturing flag" is "0," NULL is recorded as values for the respective items.

The "relevant image file name" is the file name of a relevant image which is another one of the simultaneously-captured images. Therefore, the file name of a second image captured by the second image-capturing system is recorded as the value of the "relevant image file name" in the header of the first image captured by the first image-capturing system. The file name of a first image, which also serves as the value of the "relevant image file name," is recorded in the header of the second image.

The ratio between the sizes of figures in the simultaneously-captured two images is recorded as the "Magnifying power." This magnifying power is determined by the ratio between the focal length of the first image (an image captured by the first image-capturing system) and the focal length of the second image (an image captured by the second image-capturing system) associated with the first image and the ratio between a pixel pitch of the first image and that of the second image. Specifically, when the pixel pitch of the first image is taken as p1, the focal length of the first image is taken as f1, the pixel pitch of the second image is taken as p2, and the focal length of the second image is taken as f2, the magnifying power M is determined by the following equation.

$$M=(f2/p2)/(f1/p2)=(f2/f1)\cdot(p1/p2) \qquad (1).$$

In the case of an image-capturing system having a zoom lens, the focal length is changed as appropriate. In this case, the amount by which the zoom lens is driven during image-capturing operation is detected by an encoder provided in a lens drive mechanism, and a set focal length is calculated from the drive amount, and the magnifying power M is calculated from the thus-obtained set focal length.

This magnifying power M will be described more specifically. Consideration is now given to a case where a first image having a 35 mm-film equivalent focal length of 23 mm is captured by use of the first image-capturing system 20, and a second image having a 35 mm-film equivalent focal length of 69 mm is captured by use of the second image-capturing system 30. In this digital camera 10, the first image-capturing element 22 and the second image-capturing element 32 have the same screen size and the same number of pixels. Therefore, a ratio of pixel pitches p1/p2 is determined as one. The magnifying power M is computed by means of solely the ratio of focal lengths. In the case of the present embodiment, the magnifying power M is calculated as $f2/f1=69/23\approx3$.

"Compensation start position X" and "compensation start position Y" are pieces of information showing a positional relationship between the subjects whose images have been captured in the form of the first image and the second image, and correspond to an X-coordinate value and a Y-coordinate value in the first image from where compensation of the second image is to be started. Compensation of the second image will be described by reference to FIGS. 6A and 6B.

Figure 6B:
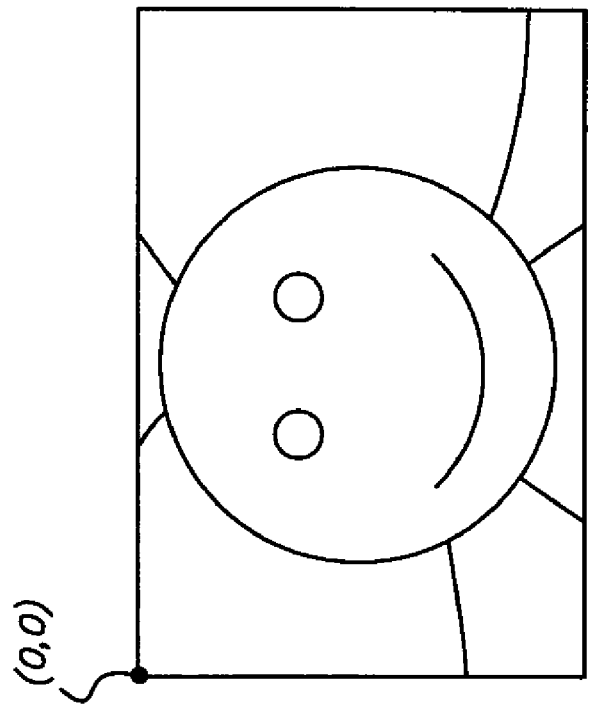
FIGS. 6A and 6B are conceptual renderings of first and second images.
Figure 6A:
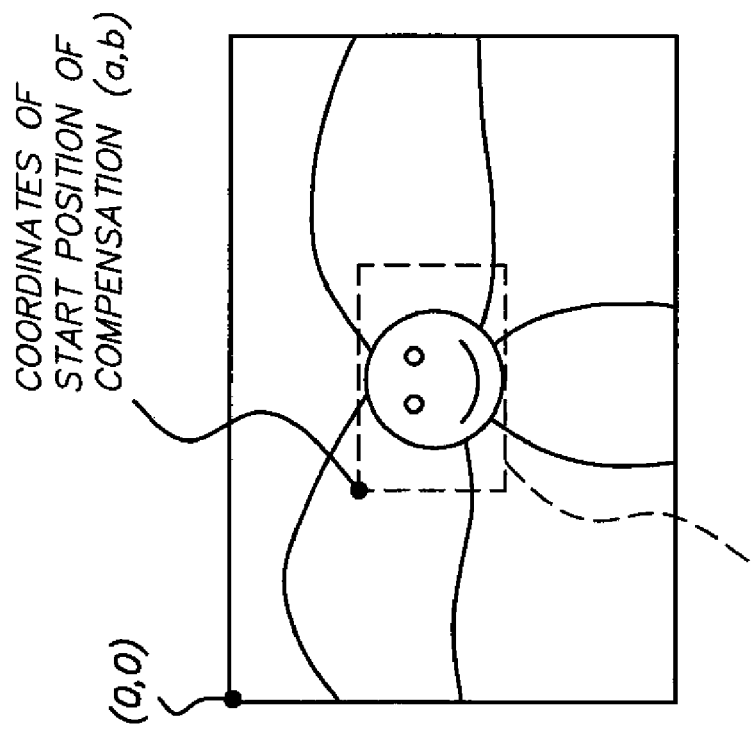

FIG. 6A is a conceptual rendering of a first image which is a wide-angle image, and FIG. 6B is a conceptual rendering of a second image which is a telescopic image. When the first and second images are equal to each other in terms of a pixel pitch and have a magnifying power M of 3, the second image becomes equal to an image which is formed by enlarging the center of the first image and its vicinity by a factor of about three. Put another word, an area of about one-third of the center of the first image and its vicinity falls within the range of the figure captured in the second image.

A target which receives the user's attention; for example, a figure or the like, is often situated at the center of the first image, and high-definition portraying of the target is desired. However, in the case of a wide-angle image captured with inclusion of a background that is the surroundings of the target, and the like, there are many cases where the target fails to acquire sufficient resolution. For this reason, there is a case where only the target is acquired as a telescopic image and the target in the wide-angle image is compensated with the telescopic image. Various compensation techniques are available, and the conceivable simplest method is to paste a telescopic image into the center of a wide-angle image. Another conceivable method is to replace the center of a wide-angle image with a telescopic image when the center of the wide-angle image is displayed in an enlarged manner. In order to perform such compensating operation, there must have been known in advance a coordinate position in a wide-angle image corresponding to the position of a figure at the reference coordinate position [e.g., the position of coordinates (0,0)] in a telescopic image. To this end, the digital camera 10 records in an image file a coordinate position in a wide-angle image, which corresponds to the position of a figure at a reference coordinate position in a telescopic image, as a "compensation start position X" and a "compensation start position Y."

This digital camera 10 records in an image file a coordinate position of a wide-angle image (a first image) corresponding to the position of a figure at a position (0,0) in a telescopic image (a second image) as a "compensation start position X" and a "compensation start position Y." In the example shown in FIGS. 6A and 6B, coordinates (a, b) in the first image indicate the position of the figure which corresponds to coordinates (0,0) in the second image. Therefore, the coordinates (a, b) are stored as the "compensation start position X" and the "compensation start position Y."

The center of the first image does not necessarily coincide with the center of the second image, because of an offset between the position of the first image-capturing lens 21 and that of the second image-capturing lens 31, a misalignment between the optical axis of the first image-capturing lens 21 and that of the second image-capturing lens 31, and the like. Consequently, when the "compensation start position X" and the "compensation start position Y" are calculated, the amount of displacement between the centers of the two images has been calculated in advance from known information, such as an interval between the first image-capturing lens 21 and the second image-capturing lens 31, a distance to a subject, a focal length, and the like. It is better to calculate an accurate "compensation start position X" and an accurate "compensation start position Y" from the amount of displacement.

In the above descriptions, when the image has been captured in the combination mode, values of the respective items are recorded in each of the first and second image files. However, the values of the items may be recorded in only either one of the first image file and the second image file. When relevant information is stored in only one of the image files, it is desirable to record the relevant information in the first image, which is a wide-angle image, by priority. For instance, the "simultaneous image-capturing flag" and the "relevant image file name," which have already been described, may be recorded in the header of the first image file. In the header of the second image file, the "simultaneous image-capturing flag" may first be set to 0, and "NULL" may be recorded in the "relevant image file name" and the "magnifying power." After the "simultaneous image-capturing flag" of "1" and the "relevant image file name" have been recorded in the header of the second image file, "NULL" may be recorded in the "magnifying power" and the "compensation start coordinate."

There will now be described a case where a portion of the wide-angle image (the first image) may be compensated with the telescopic image (the second image) by use of an image file including such relevant information. Compensation of an enlargedly-displayed wide-angle image is an example compensation of a telescopic image. According to this compensation, when a wide-angle image is enlargedly displayed on the liquid-crystal monitor 80 provided in the digital camera 10 and when the number of pixels in the displayed image has become lower than the number of pixels of the liquid-crystal monitor 80, a telescopic image is displayed in place of the wide-angle image.

Figure 7A:
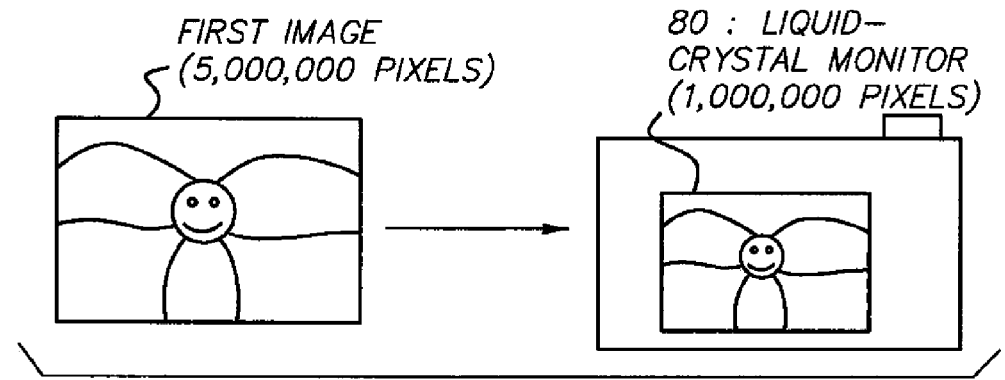
FIGS. 7A to 7C are views showing the manner in which a captured image is displayed on a liquid-crystal monitor.
Figure 7B:
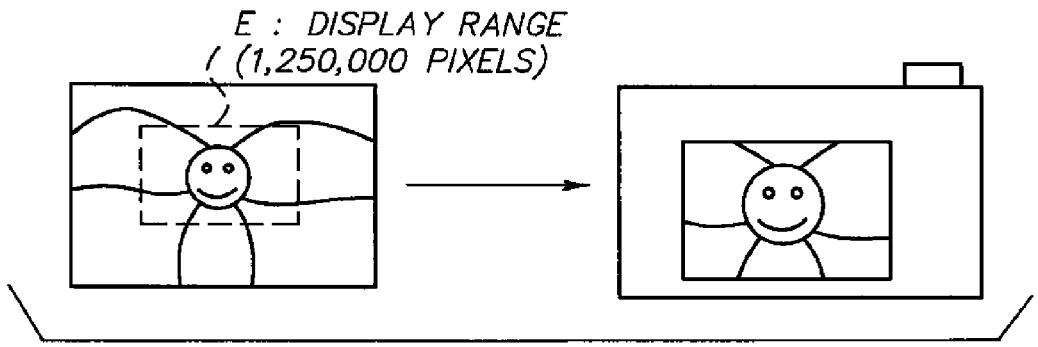
Figure 7C:
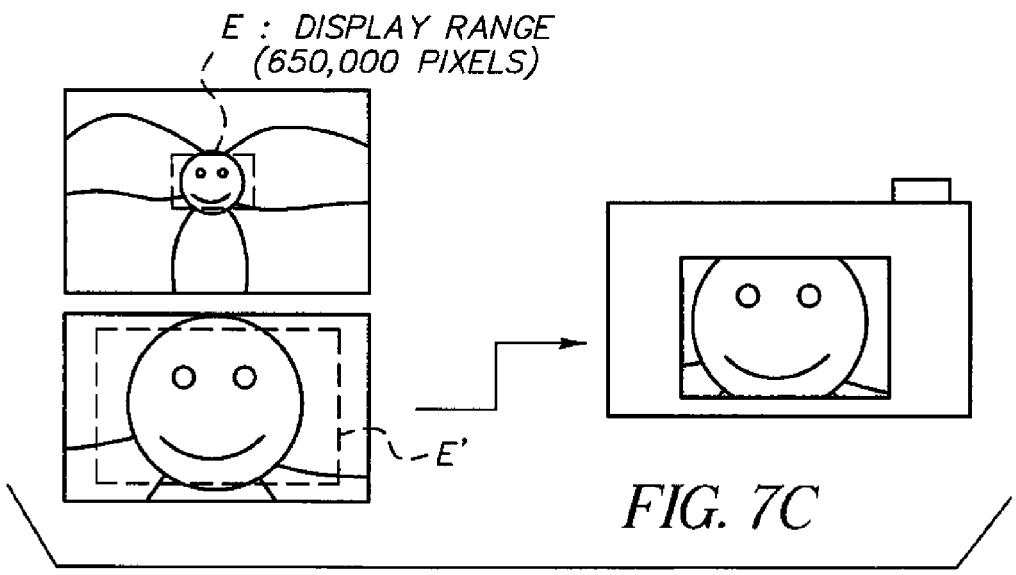

A specific example will now be described by reference to FIG. 7. In FIG. 7, each of the first image corresponding to the wide-angle image and the second image corresponding to the telescopic image is assumed to have 5 million pixels and a magnifying power M of 3. The number of pixels of the liquid-crystal monitor 80 is one million.

In this state, the user is assumed to have commanded display of a first image corresponding to a wide-angle image. In this case, the CPU 50 reads the designated first image and causes the liquid-crystal monitor 80 to display the entire image. At this time, the liquid-crystal monitor 80 is smaller than the first image in terms of the number of pixels. Therefore, when the first image is displayed, the number of pixels of the first image has been reduced in advance so as to become equal to the number of pixels of the liquid-crystal monitor 80. In the present embodiment, the first image has five million pixels whilst the liquid-crystal monitor 80 has one million pixels. Therefore, the number of pixels of the first image is reduced by a factor of one-fifth.

The user is assumed to have commanded to zoom in the display by a factor of 2 in this state. In this case, about one-fourths of a range from the center of the first image serves as a display range E to be displayed on the liquid-crystal monitor 80 (see FIG. 7B). In this case, the number of pixels falling within the display range E is about 1.25 million pixels, which is greater than the number of pixels of the liquid-crystal monitor 80. Therefore, in this case, the area of the first image corresponding to the display range E is clipped, and the thus-clipped image is matched to the number of pixels of the liquid-crystal monitor 80. Specifically, pixels are reduced in such a way that the number of pixels in the display range is reduced by about 80%. The thus-reduced image is displayed on the liquid-crystal display 80.

Subsequently, the user is assumed to have commanded to zoom in the display by a factor of 2. In this case, about one-eighths of a range from the center of the first image serves as a display range E to be displayed on the liquid-crystal monitor 80 (see FIG. 7C). In this case, the number of pixels falling within the display range E is about 650,000 pixels, which is much smaller than the number of pixels of the liquid-crystal monitor 80. The CPU 50 does not display the first image intact. When there is a second image which is a telescopic image captured simultaneously with the wide-angle image, the second image is displayed on the liquid-crystal monitor 80.

Specifically, when the number of pixels included in the display range E is determined to become smaller than the number of pixels of the liquid-crystal monitor 80, the CPU 50 ascertains the "simultaneous image-capturing flag" recorded in the header of the first image file. When the "simultaneous image-capturing flag" is set to 0, a simultaneously-captured telescopic image is not present. In this case, the display range E of the first image is clipped in an unmodified form, and the number of pixels of the thus-clipped portion is increased so as to match the number of pixels of the liquid-crystal monitor 80, and is then displayed on the liquid-crystal monitor 80.

Meanwhile, when a value of "simultaneous image-capturing flag" is set to 1, a value of "relevant image file name," a value of "magnifying power," and a value of "compensation start position" are read, and these values are temporarily stored. The second image file, which is a relevant image file recorded in the "relevant image file name," is read. The number of pixels of the second image is first corrected so as to match the number of pixels of the liquid-crystal monitor 80, and the second image is then displayed on the liquid-crystal monitor 80. At this time, a display range E' in the second image is calculated from the magnifying power, the compensation start position, and the display range E in the first image.

As mentioned above, when the number of pixels included in the display range E in the first image has become smaller than the number of pixels of the liquid-crystal monitor 80, the simultaneously-captured second image is displayed, thereby significantly diminishing degradation of image quality resulting from enlarged display of the image.

Figure 8:
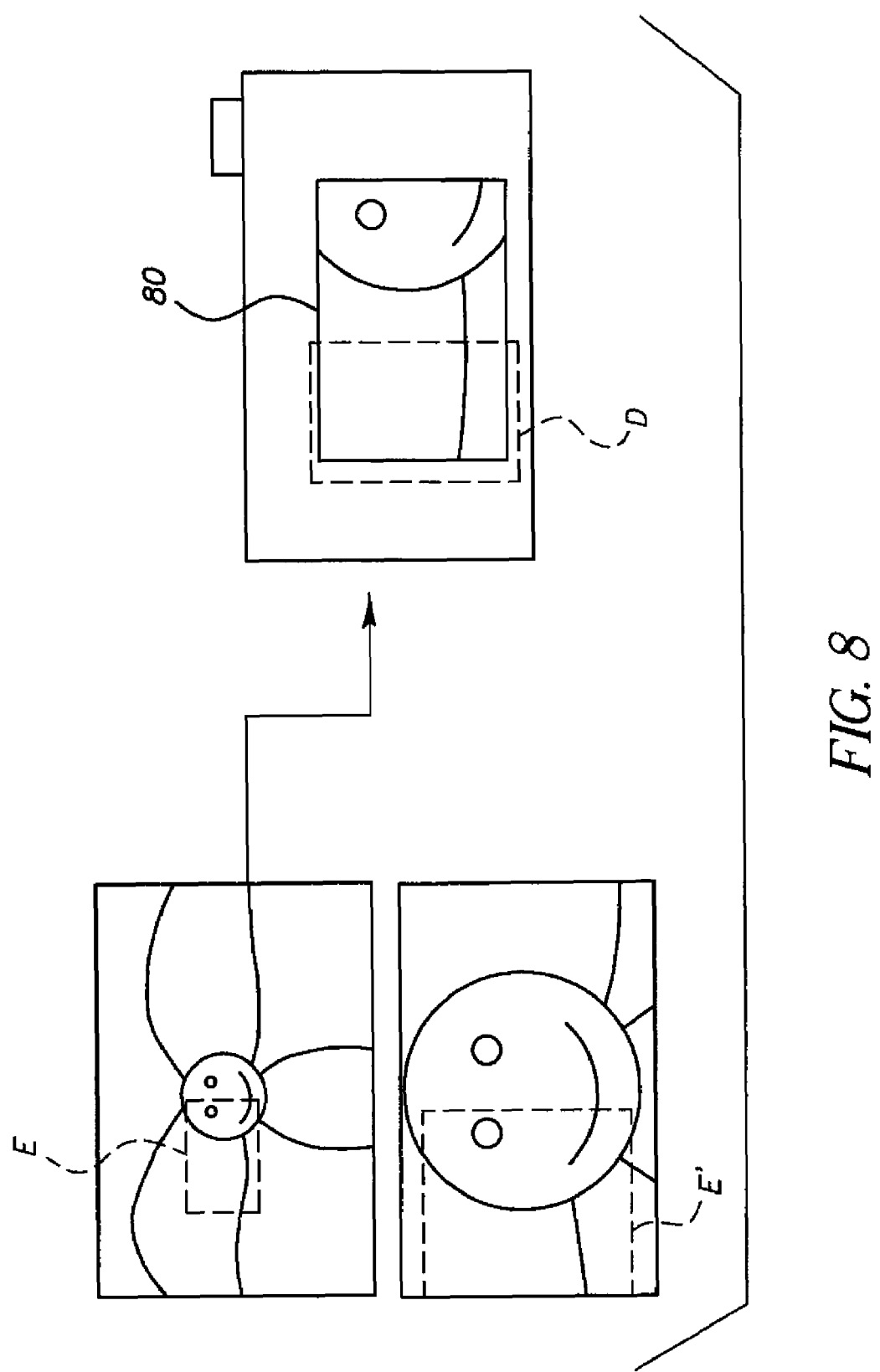
FIG. 8 is a view showing the manner of moving a display position in the liquid-crystal monitor.

When the display range E has extended off the figure range of the second image, the first image is subjected to electronic zooming (the number of pixels of the first image is increased), and the thus-zoomed image is displayed on the liquid-crystal monitor 80. As shown in FIG. 8, for instance, the display position is assumed to have been moved leftward from the position shown in FIG. 7C. In this case, a portion of the display range E extends off the figure range of the second image. In this case, the CPU 50 reads the simultaneously-captured wide-angle image recorded in the header of the second image file; namely, the file name of the first image, and displays the thus-read first image. The display range E in the first image is calculated from the magnifying power, the compensation start position, and the display range E' in the second image. At that moment, the number of pixels in the display range E of the first image is smaller than the number of pixels of the liquid-crystal monitor 80. Therefore, when the display range E of the first image is displayed on the liquid-crystal monitor 80, the number of pixels in the display range E has been increased in advance by means of interpolation, so as to match the number of the pixels of the liquid-crystal monitor 80. In this embodiment, when a portion of the display range E has extended off the figure range of the second image, the entire display range E is replaced with the first image. However, it may be the case that only the area having extended off the range is replaced with the first image. Specifically, for the case of the embodiment shown in FIG. 8, the first image may be displayed in an area D having extended off the display range E, and the second image may be displayed in the other area.

The method for compensating for the image display on the liquid-crystal monitor 80 built in the digital camera 10 has been described. This compensation method can be applied to a case where an image is displayed on another display device; e.g., a monitor of a personal computer, and the like. Specifically, in a case where the first image is displayed in an enlarged manner on the monitor of the personal computer, when the number of pixels in the first image within the display range has become smaller than the number of pixels of the monitor, the second image may also be displayed.

Another embodiment where a portion of a wide-angle image (the first image) is compensated with the telescopic image (the second image) will now be described. Compensation performed during printing is conceivable as another example compensation using a telescopic image. When a digital image is printed, a pixel density of 200 dpi or more is usually said to be required for an output print. In order to fulfill conditions of a pixel density of 200 dpi or more in an image of 2592 (width)×1944 (height) pixels (about 5 million pixels), there is no way but to reduce a print size to 12.96 inches (329 mm)×9.72 inches (247 mm) or less. In order to obtain an output print of larger size, there is a necessity for reducing image quality or capturing an image with an image-capturing element of higher resolution. However, the reduction in image quality poses a problem of causing dissatisfaction on the user's part. The use of a higher-resolution image-capturing element poses a problem of a necessity for an expensive camera for capturing an image.

In general, high image quality is not required over the entire range of a captured image. Particularly, for the case of a portrait, high attention is paid to the center portion of an image where a person is located. However, in many cases, low attention is paid to the periphery of the person; namely, the degree of attention paid to a background is low. In the case of an image where high attention is paid to only a part of the image, the user's satisfaction can be attained by means of printing only the portion of interest with high quality.

As in the case of the embodiment, when the wide-angle image (the first image) and the telescopic image, which are formed by means of having essentially simultaneously captured a single subject, are stored in an associated manner, compensating only a portion of interest for the user (the center portion of the image) of the wide-angle image with the telescopic image and printing the thus-compensated image can be conceived.

Figure 9:
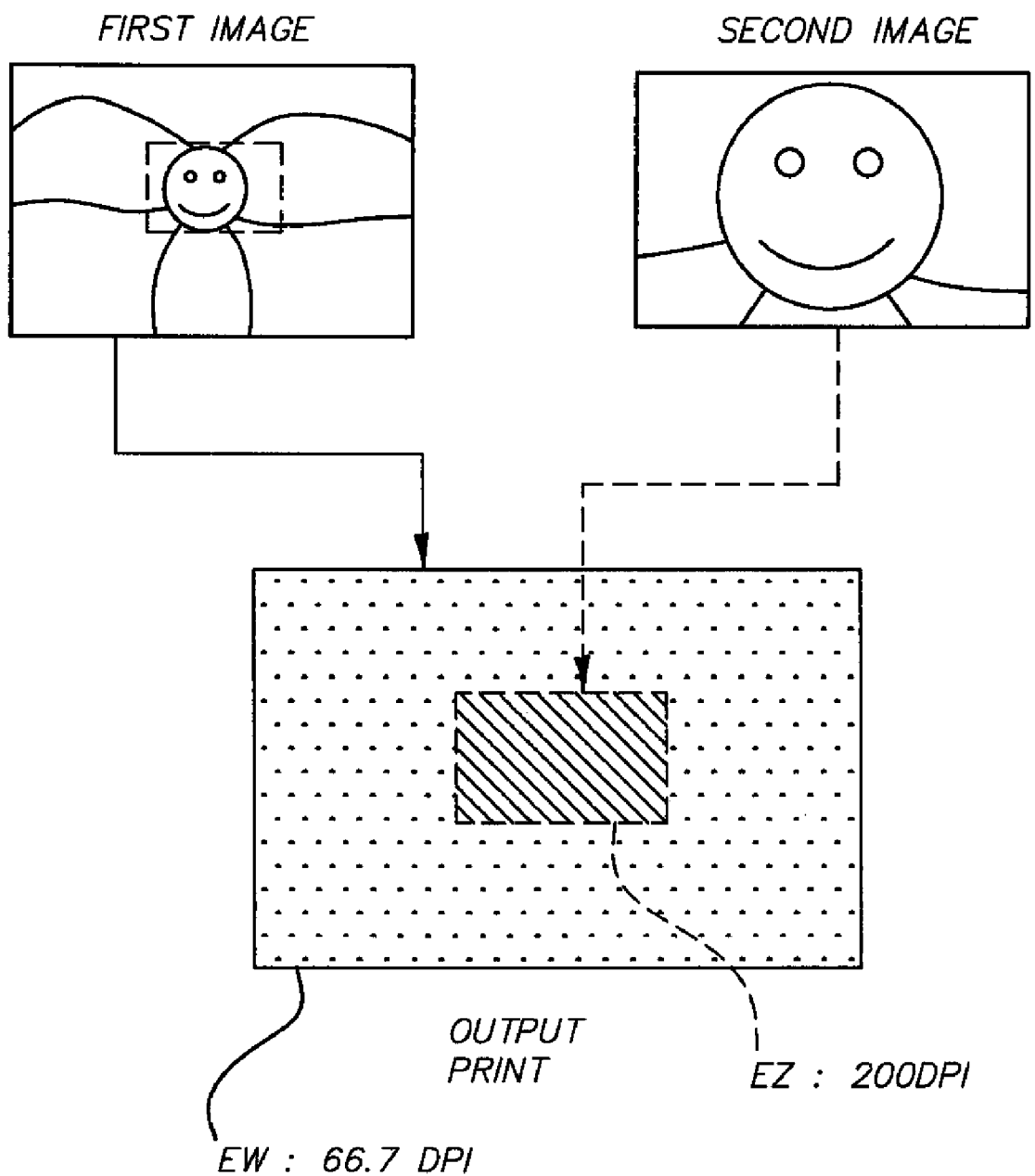
FIG. 9 is a view showing the manner of printing a portion of the first image while compensating the same with the second image.

Specifically, by reference to FIG. 9, there will now be described a case where the first image of 2592 (width)×1944 (height) pixels (about 5 million pixels) is printed to a size of 38.9 inches×29.2 inches. When the user has commanded printing of the first image, a printer driver calculates a pixel density of an output print from the number of pixels of the image and the print size specified by the user. When the obtained pixel density is a predetermined reference value; e.g., 200 dpi, or less, the printer driver ascertains the value of the flag in the simultaneously-captured image recorded in the header of the first image file. In the case of the present embodiment, the pixel density achieved after printing is about 67 dpi, and the printer driver ascertains the values of the flag in the simultaneously-captured image. Consequently, when the value of the flag in the simultaneously-captured image is 0; namely, when a simultaneously-captured relevant image is not available, the printer driver performs ordinary print processing. Specifically, the printer driver generates print data by means of converting the first image into a printer language, and performs print processing on the basis of the print data. The pixel density achieved through printing is about 67 dpi.

Meanwhile, when the value of the flag in the simultaneously-captured image is "1"; namely, when two simultaneously-captured telescopic images are present, the names of the image files, magnifying power, and the compensation start position are read. The size of the second image, which is achieved by means of compensating for a portion of the first image with the second image in accordance with the print size and the magnifying power, is calculated as a compensation size. The term "compensation size" refers to the size of the second image achieved when the first image is printed after the portion of the first image has been compensated with the second image. In the present embodiment, when magnifying power M is three, about one-third of the first image is replaced with the second image. Accordingly, the compensation size is one-third of the print size; namely, about 12.96 inches×9.72 inches. When the compensation size has been calculated, pixel density used for printing the second image is next calculated from the compensation size and the number of pixels of the second image. On condition that the second image has the same number of pixels as does the first image, the pixel density achieved during printing of the second image is about 200 dpi. The range of the first image which is compensated with the second image; namely, the range where replacement is to be performed, is calculated from the compensation size and the compensation start position as a compensation range Ez.

After completion of the calculation, the printer driver generates print data used for printing the image that has been formed by replacing the compensation range of the first image with the second image. At that moment, the print data are generated on condition that the pixel density of the compensation range Ez is 200 dpi and the pixel density of a print range Ew other than the compensation range Ez is 67 dpi. After generation of the print data, print processing is performed on the basis of the print data.

As mentioned above, the portion of the first image; namely, the center portion of the first image which gains the high degree of user's attention, is compensated with the second image that is the telescopic image, and the thus-compensated first image is printed, so that the area of high interest can be printed at high pixel density. Consequently, even when the size of the print has been increased, an output print which affords great satisfaction to the user can be acquired. Meanwhile, the peripheral area other than the center area is printed on the basis of the first image, and hence the pixel density of the peripheral area is low. However, in many cases, the user's attention paid to the peripheral area is low. Even when the pixel density of the peripheral area is low, the user's satisfaction is not greatly affected. Namely, in the present embodiment, even when the print size is increased, an output print which affords great satisfaction to the user can be obtained.

When the first image is printed after a portion of the first image has been replaced with the second image, there may arise a case where the user feels a sense of discomfort induced by discontinuity between the items of data along the boundary area between the first and second images. A weighted average between the pixel data pertaining to the first image and the pixel data pertaining to the second image may be obtained in connection with the periphery of the boundary between the first and second images, to thus effect gradual transition from the first image to the second image. As a distance from the boundary line between the first and second images increases outwardly, a weighting coefficient W1 of the first image is increased. Conversely, as the distance increases inwardly with reference to the boundary line, a weighting coefficient W2 of the second image is increased. A weighted average Mave=$\{(M1 \cdot W1)+(M2 \cdot W2)\}/2$ of the weighting coefficients W1, W2; the pixel data M1 pertaining to the first image=(R1, G1, B1); and the pixel data M2 pertaining to the second image=(R2, G2, B2) are taken as pixel data for printing operation. In the periphery of the boundary, gradual transition from the first image to the second image is effected, whereby a natural printed image is obtained and higher user satisfaction can be achieved.

As is evident from the above descriptions, in the present embodiment, only when compensation using the second image is required, data pertaining to the first image and data pertaining to the second image are managed so that the second image can be used. Put another way, the first image and the second image are stored and retained in memory as separate items of image data. Consequently, when compared with a case where an image formed from synthesis of the first and second image is stored and retained, a required data size is significantly reduced, and the user's satisfaction is more easily attained.

Figure 10:
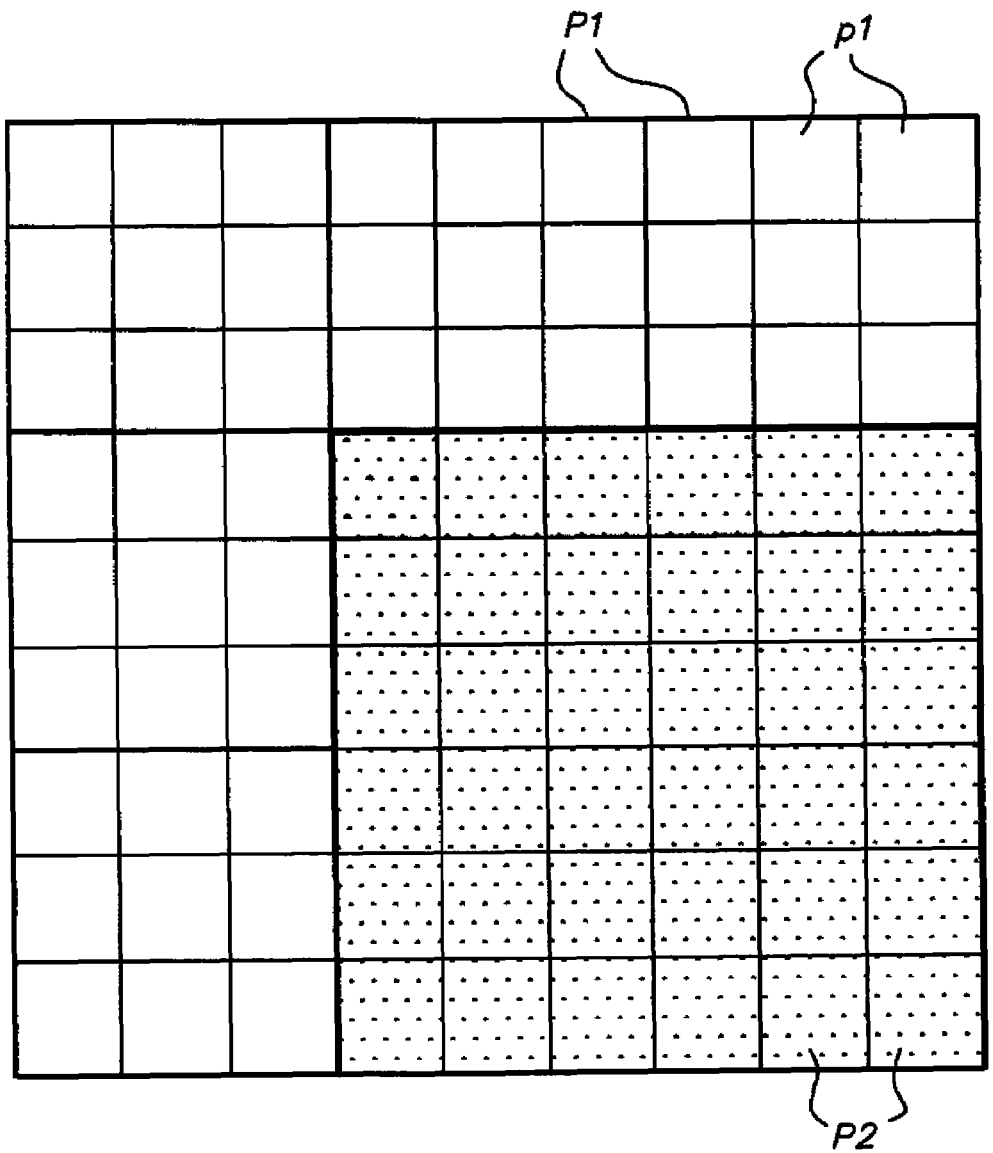
FIG. 10 is a view showing example interpolation of pixels performed when the first image and the second image are synthesized together.

When an image formed from synthesis of the first and second image is generated and stored, the first image must be interpolated so as to match the number of pixels of the second image. Specifically, it is assumed that the first and second images are equal in the number of pixels and that magnifying power M is three. In this case, in order to obtain an image formed from synthesis of the first and second images, the figure range indicated by one pixel of the first image must be matched with the figure range indicated by one pixel of the second image. Before interpolation of pixels, one pixel of the second image corresponds to one-ninth of one pixel of the first image. Therefore, in order to synthesize the images, pixels must be interpolated such that one pixel of the first image is increased to nine pixels, as shown in FIG. 10. In FIG. 10, hatched squares depict pixels P2 of the second image. Squares outlined by thick lines depict pixels P1 of the first image. Unhatched squares outlined with fine lines depict the pixels p1 of the first image acquired before interpolation of the pixels. As shown in FIG. 10, in order to synthesize the first and second images, each of the pixels P1 of the first image must be interpolated to nine pixels. When the first image having undergone such pixel interpolation and the second image are synthesized, the data size of resultant image data becomes nine times as large as that of the first image achieved before pixel interpolation, which in turn puts a squeeze on memory having finite storage capacity.

In contrast, in the present embodiment, predetermined data are embedded into the header of an image file so that compensation can be performed by a second image only when required, and the first and second images are preserved as separate items of data. Therefore, an increase in the number of pixels, which would otherwise be caused by pixel interpolation, is prevented, and no squeeze is put on memory having limited storage capacity. Concurrently, since the images are managed in such a manner that the first image can be compensated with the second image as required, the user's satisfaction can also be fulfilled. Consequently, there can be provided the digital camera 10 that on the whole affords high satisfaction to the user.

Parts List
10 camera
20 first image-capturing system
21 first image-capturing lens system
22 first image-capturing element
23 analogue image processing circuit
24 AD conversion circuit
25 buffer memory
26 signal processing sections
30 second image-capturing system
31 second image-capturing zoom lens
32 second image-capturing element
33 analogue image processing circuit
34 AD conversion circuit
35 buffer memory
36 signal processing sections
40 multiplexer
50 CPU
60 signal processor (S1007) (S1015) (S1024) (S1026)
62 buffer memory
70 user memory (S1010) (S1029)
80 liquid-crystal monitor (S1009) (S1017) (S1028)
90 operation section
91 release button
92 zoom button
93 cross-key pad
94 switching lever (S1002)
95 playback button
100 control section
110 strobe firing section
S1001 first release state
S1003 operating state
S1004 incident light
S1005 second release state
S1006 image-capturing operation
S1008 image and header date
S1011 operating state
S1012 zooming
S1013 second release state
S1014 image-capturing operation
S1016 image data and header data
S1018 memory
S1020 operating state
S1021 AF and zooming
S1022 second release state
S1023 image-capturing operation
S1025 image data and header data
S1027 image data and header data

What is claimed is:

1. A digital imaging system comprising:
   (a) a digital camera comprising:
      (i) a first image-capturing system having a wide-angle view which captures a first image of a subject and produces first image data, and a second image capture system having a telescopic view which essentially simultaneously captures a second image of the subject and produces second image data; and
      (ii) a memory for storing the first image data, the second image data, and related information including at least one magnification value and at least two coordinate values which indicate the positional relationships between the first image and the second image; and
   (b) a printer for printing images captured by the digital camera, wherein the printer uses the related information and the second image data in order to compensate a center portion of the first image data to produce print data, and uses the print data to produce a printed image; wherein the print data corresponding to the central portion of the printed image; is produced using only the second image data.

2. A digital imaging system comprising:
   (a) a digital camera comprising:
      (i) a first image-capturing system having a wide-angle view which captures a first image of a subject and produces first image data, and a second image capture system having a telescopic view which essentially simultaneously captures a second image of the subject and produces second image data; and
      (ii) a memory for storing the first image data, the second image data, and related information including at least one magnification value and at least two coordinate values which indicate the positional relationships between the first image and the second image; and
   (b) a printer for printing images captured by the digital camera, wherein the printer uses the related information and the second image data in order to compensate a center portion of the first image data to produce print data, and uses the print data to produce a printed image; wherein the print data corresponding to a boundary area adjacent to the central portion of the printed image is produced using a weighted average of the first image data and the second image data.

* * * * *